United States Patent [19]

Karmel et al.

[11] 3,867,701

[45] Feb. 18, 1975

[54] METHOD OF CHANGING A PHASE DIFFERENCE IN AN INPUT PULSE TO A PULSE RATE

[75] Inventors: Paul R. Karmel, Hastings-on-Hudson, N.Y.; William E. Toth, Bolton; Milton B. Trageser, Winchester, both of Mass.

[73] Assignee: The United States of America as represented by the Secretary of the Air Force, Washington, D.C.

[22] Filed: Sept. 27, 1968

[21] Appl. No.: 763,420

[52] U.S. Cl................ 328/134, 307/232, 328/37
[51] Int. Cl............................ H03k 5/20, H03k 9/06
[58] Field of Search........... 328/37, 43, 51, 55, 134; 307/232

[56] References Cited
UNITED STATES PATENTS 3,411,094  11/1968  Martinek .............................. 328/37

*Primary Examiner*—Malcolm F. Hubler
*Attorney, Agent, or Firm*—Harry A. Herbert, Jr.; Jacob N. Erlich

[57] ABSTRACT

A method of changing a phase difference in an input pulse to a pulse rate in the output by feeding pulses into the lower register of a digital differential analyser, feeding the output pulses from the upper register of the analyser into a less significant bit of the lower register (with reversed sign) and comparing the number of output pulses generated with a standard.

2 Claims, 10 Drawing Figures

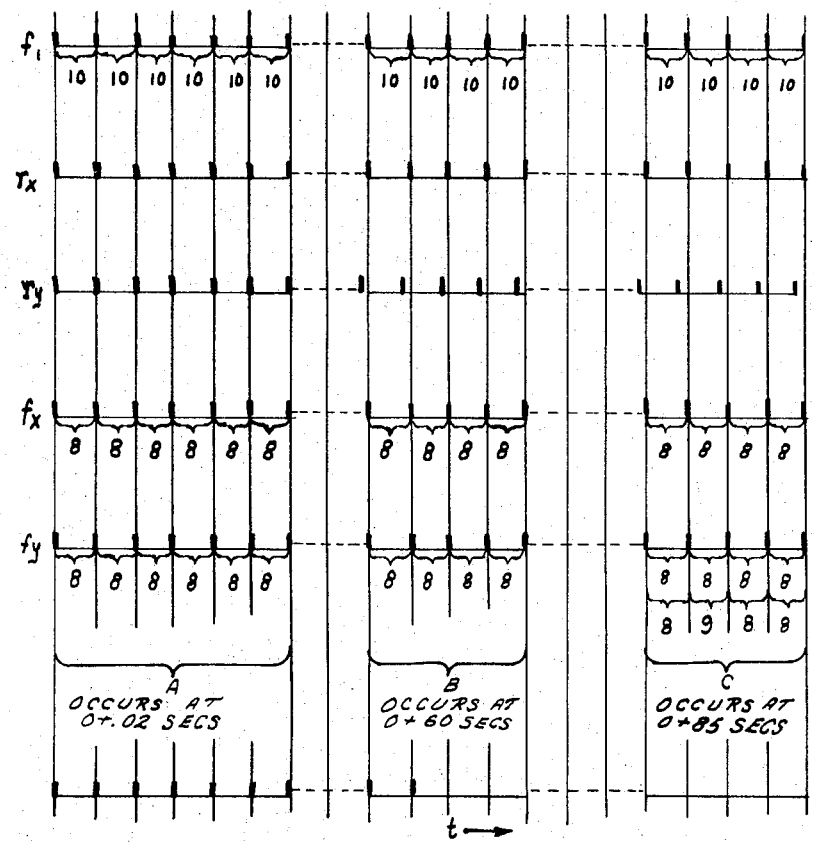
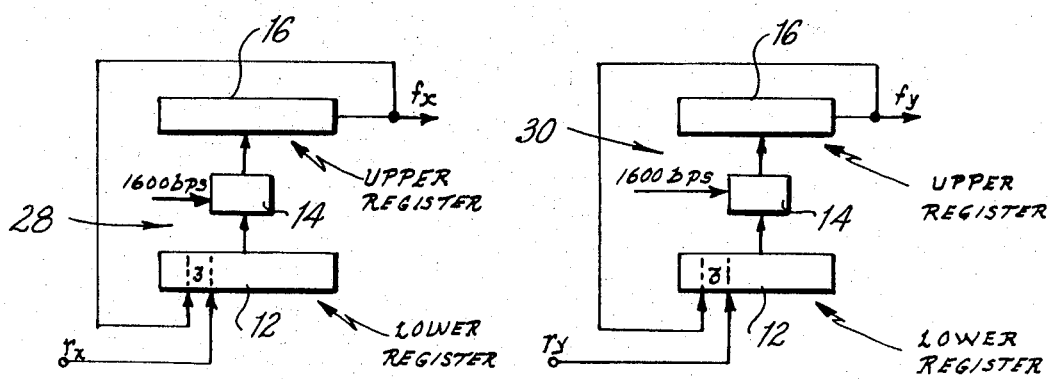

METHOD OF CHANGING A PHASE DIFFERENCE IN AN INPUT PULSE TO A PULSE RATE

BACKGROUND OF THE INVENTION

This invention relates generally to a vertical and azimuth erection system for inertially guided intercontinental ballistic missiles and, more particularly, to a method of changing a phase difference in an input pulse to a pulse rate in the output in order to speed the taking of differences between the accelerometer outputs in, for example, the above vertical and azimuth erection system.

Previous to the firing of an inertially guided intercontinental ballistic missile the stable platform of the inertial system must be accurately aligned with respect to the vertical and an azimuth reference. Broadly, these procedures can be divided into two classes, in the first of which azimuth erection is effected by optical means and vertical erection is effected by using the platform's accelerometer outputs, while in the second class, both vertical and azimuth erection are effected by utilizing the accelerometer outputs.

Erection to the vertical, for example, is accomplished by using the accelerometer signals; in an ideal condition each accelerometer makes the same angle with the axis of the stable member and thus with gravity. Hence all accelerometers should have the same outputs. Erection is provided by comparing accelerometer signals after compensation for nonstandard parameters. The accelerometer output signals are normalized and compared in the digital computer. The difference between the $x$ and $y$ accelerometer outputs, after suitable processing, (which in this case constitutes the instant invention), turns a digistepper shaft on which is mounted a potentiometer which provides a signal to the $z$ gyro torque amplifier. This torques the $z$ gyro in a direction which will make the $x$ and $y$ accelerometer outputs equal. Similarly comparison of $x$ and $y$ accelerometer outputs is used to command the $y$ gyro, and comparison of $y$ and $z$ accelerometer controls the $x$ gyro.

The output device of a 25 Pendulous Integrating Gyro Accelerometer Unit is an optisyn, which has an output of electrical pulses or bits, and is, thus, inherently digital in nature. The nominal scale factor of the unit ($K_A$) is 240 bits per sec g acceleration along the input axis. The output of the optisyn is not completely regular, as the time at which an output bit occurs will randomly vary by ± 10 per cent of the time between bits.

The accuracy of the vertical erection is seen to depend on accurately taking the differences between accelerometer output pulse rates. The previous method heretofore used in comparing bit rates was to simply sum the outputs of each accelerometer and then subtract one sum from the other, a total of 100,000 bits must be accumulated to achieve a desired accuracy of one part in 100,000. The time to accumulate this many bits is $T = (100,000/240 \cos \theta_o = 720 \sec = 12 \min$ which is unacceptably long.

SUMMARY OF THE INVENTION

The method of the instant invention substantially reduces the time to accumulate these bits. Although the method of the instant invention has many applications, it has been found, for example, to be extremely useful in vertical and azimuth erection systems. Therefore, for simplicity, it will be explained in detail in conjunction with such a system.

The instant method used to shorten the time needed to obtain the above mentioned accuracy (of one part in 100,000) is equivalent to measuring the time between pulses with a scale divided into elevenths of the nominal time between pulses instead of the above counting method, which uses a scale undivided between pulses. The time is thus shortened by a factor of about 10 (it cannot be made shorter than this due to the dither or noise in the accelerometer output bits).

The method of the instant invention basically comprises of feeding the accelerometer output pulses into the lower (or $Y$) register of a digital differential analyser, feeding the output pulses from the upper register into a less significant bit of the lower register (with reversed sign) and comparing the overflows of the upper registers.

It is therefore an object of this invention to provide a method for speeding the taking of differences between accelerometer outputs.

It is a further object of this invention to provide a method of changing a phase difference in an input pulse to a pulse rate in the output.

It is another object of this invention to provide a method for improving the operation of a vertical and azimuth erection system by increasing the speed at which accelerometer output data can be compiled.

For a better understanding of the present invention, together with other end and further objects thereof, reference is had to the following description taken in connection with the accompanying drawings and its scope will be pointed out in the appended claims.

DESCRIPTION OF THE DRAWINGS

In the drawings:

FIG. 8 represents a plot of accelerometer pulse trains;

FIG. 9A represents the X interpolator; and

FIG. 9B represents the Y interpolator.

DESCRIPTION OF THE PREFERRED METHOD

In order to more clearly understand the instant invention, the theory of the Vertical and Azimuth Erection System will be hereinafter set forth. Such a system is not to be construed as being part of the instant invention, but only as an example wherein the instant method may be utilized.

Before deriving the equations which the erection system will instrument, it is first necessary to define three sets of orthogonal axes. The first set corresponds to the accelerometer reference input axes (i.e., the position of the input axes if there were no accelerometer misalignment) and is hereafter called the system or "S" set. The second is a reference or "R" set and is fixed in rotating earth space in the position of the "S" set when erection is complete. The third set is composed of unit vectors directed east ($\bar{1}_E$), north ($\bar{1}_N$) and up ($\bar{1}_V$) at the erection site, with $\bar{1}_V$ being along but oppositely directed from the local gravity vector.

Corresponding axes of the "R" and "S" sets are nearly coincident at all times. A unique axis exists about which the "S" set can be brought into coincidence with the "R" set by a single rotation. An angular displacement vector $\bar{\beta}_{Sr}$ (or, for ease in writing, $\bar{\beta}$) can be defined as a vector which lies along this axis having a magnitude equal to the smallest angle through which the "S" set must be rotated to bring it into coincidence with the "R" set and having its sense chosen to conform with the right handed system.

The vertical indicated by the platform is:

$$\bar{1}_{VI} = \bar{1}_V + \bar{1}_V \times \bar{\beta} \qquad (1)$$

To find the vector angle through which the platform must be rotated to make $\bar{1}_{VI}$ coincident with $\bar{1}_V$ (i.e., to vertically erect the platform) take:

$$(-g\ \bar{1}_V) \times \bar{1}_{VI} = -g\bar{1}_V \times [\bar{1}_V + \bar{1}_V \times \bar{\beta}] \qquad (2)$$

$$= g\ [\bar{\beta} - \bar{1}_V (\bar{1}_V \cdot \bar{\beta})] \qquad (3)$$

The rightmost term in the bracket in Equation (3) is the vertical component of $\bar{\beta}$ and, since this is subtracted from $\bar{\beta}$, the result clearly indicates a rotation about a horizontal axis.

A vertical erection transfer or performance function, (p.f.)$_V$, chosen so that the system meets the vertical erection specifications, acts upon this cross product to produce a rate of rotation $\bar{\omega}_V$ of the platform about this horizontal axis. The basic block diagram is thus as shown in FIG. 1.

Figure 1:
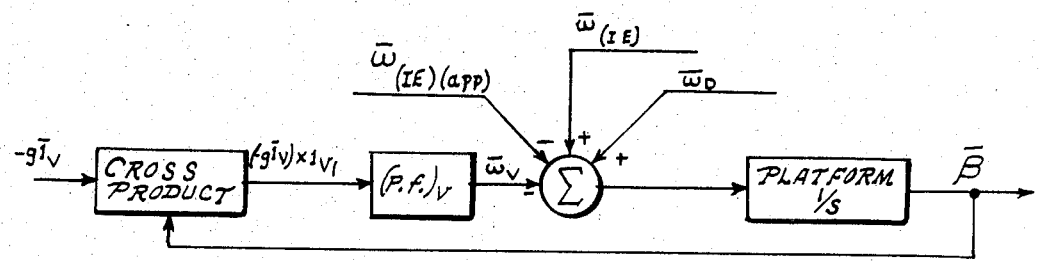
FIG. 1 represents a general block diagram for vertical erection.

In FIG. 1, $\bar{\omega}_{(IE)}$ is the rate of rotation of the earth in inertial space, $\bar{\omega}_{(IE)(app)}$ is a signal applied to the platform to compensate for $\bar{\omega}_{IE}$ and thus keep the platform stationary in earth space and $\bar{\omega}_D$ is the rate of gyro drift.

From FIG. 1 it is seen that: $\bar{\beta} = \bar{\omega}_{(IE)} - \bar{\omega}_{(IE)(applied)} - \bar{\omega}_V - \bar{\omega}_D \qquad (4)$ But:

$$\bar{\omega}_{(IE)} - \bar{\omega}_{(IE)(app)} = \bar{\omega}_{(IE)} \times \bar{\beta} \qquad (5)$$

where $\bar{\beta} = \beta_E\ \bar{1}_E + \beta_N\ \bar{1}_N + \beta_V\ \bar{1}_V \qquad (6)$ and $\bar{\omega}_{(IE)} = \omega_{(IE)N}\ \bar{1}_N + \omega_{(IE)V}\ \bar{1}_V \qquad (7)$ The vertical erection system insures that $\beta_N$ and $\beta_E$ are less than 4 sec of arc and therefore negligible compared to $\beta_V$. Thus $$\bar{\omega}_{(IE)} - \bar{\omega}_{(IE)(app)} = +\beta_V\ \omega_{(IE)N}\ \bar{1}_E \qquad (8)$$

and is therefore proportional, at any latitude, to the azimuth misorientation. Thus $$\bar{1}_E \cdot \bar{\beta} = \bar{1}_E \cdot (\bar{\beta} \times \bar{\omega}_{IE}) - \bar{1}_E \cdot \bar{\omega}_V + \bar{1}_E \cdot \bar{\omega}_D \qquad (9)$$

But the left side of Equation (9) is equal to zero since (p.f.)$_V$ is chosen to make the velocity error about any horizontal axis zero.

Then $$\bar{1}_E \cdot \bar{\omega}_V = +\beta_V\ \omega_{(IE)N} + \bar{1}_E \cdot \bar{\omega}_D \qquad (10)$$

Figure 2:
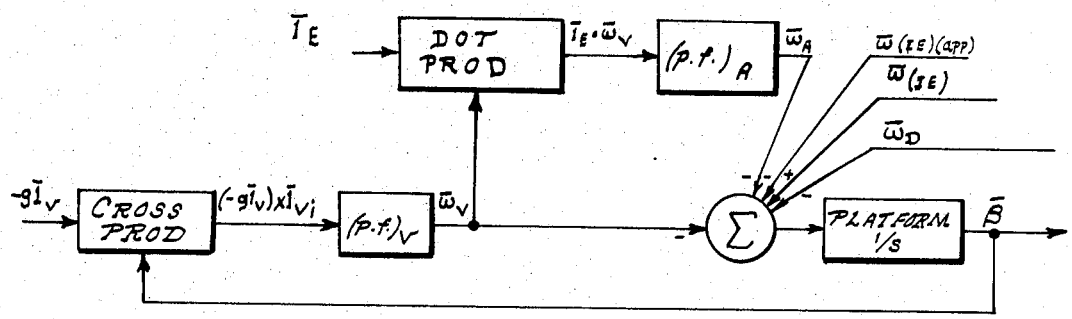
FIG. 2 represents a general block diagram for vertical and azimuth erection.

Equation (10) shows that an azimuth error can be corrected by adding an azimuth performance function, (p.f.)$_A$, which acts on the component of $\bar{\omega}_V$ about east and rotates the platform about the vertical. This system is shown in FIG. 2. The accuracy of azimuth erection is shown, by Equation (10) to be limited by $\omega_D$.

In the above system, the axes of the "S" set make the same angle ($\theta_o$) with the vertical when the system is erected. Thus:

$$-g\ \bar{1}_V = (g_{xS}\bar{i}_S + g_{yS}\bar{j}_S + g_{zS}\bar{k}_S)\ \cos\ \theta_o \qquad (11)$$

where $g_{xS}$, $g_{yS}$ and $g_{zS}$ are the components of gravity along the x, y and z accelerometer input axes respectively. Also $$\bar{1}_{VI} = (\bar{i}_S + \bar{j}_S - g_{yS})\ \bar{k}_S)\ \cos\ \theta_o \qquad (12)$$

Then $$(-g\ \bar{1}_V) \times \bar{1}_{VI} = [(g_{yS} - g_{zS})\ \bar{i}_S + (g_{zS} - g_{xS})\ \bar{j}_S + (g_{xS} - g_{yS})\ \bar{k}_S]\ \cos^2\ \theta_o \qquad (13)$$

The cross product indicated in FIG. 1 can therefore be accomplished by taking the differences between the output of the accelerometers (after correction for scale factor variation, accelerometer misalignment and other effects). The vertical performance function then acts on each of the differences.

To take the dot product indicated in FIG. 2, note that for the vertically erected system:

$$\bar{1}_E = \sin\ \theta_o\ [\sin(A + \beta_V)\ \bar{i}_S + \sin(A + 240 + \beta_V)\ \bar{j}_S + \sin(A + 120 + \beta_V)\ \bar{k}_S] \qquad (14)$$

$$\approx \sin\ \theta_o\ [\sin(A)\ \bar{i}_S + \sin(A + 240)\ \bar{j}_S + \sin(A + 120)\ \bar{k}_S] \qquad (15)$$

where A is the desired azimuth measured clockwise from north to the horizontal projection of the $\bar{i}_R$ axis. Also $$\bar{\omega}_V = \omega_{Vx}\ \bar{i}_S + \omega_{Vy}\ \bar{j}_S + \omega_{Vz}\ \bar{k}_S \qquad (16)$$

Therefore:

$$\bar{1}_E \cdot \bar{\omega}_V = \sin\ \theta_o\ [\omega_{Vx}\ \sin\ (A) + \omega_{Vy}\ \sin\ (A + 240) + \omega_{Vz}\ \sin\ (A + 120)] \qquad (17)$$

Thus, to take the dot product, multiply $\omega_{Vx}$, $\omega_{Vy}$, $\omega_{Vz}$ by the indicated trigonometric functions and add the results.

Due to the digital method to be used in implementing the vertical performance function, its form is fixed as $$(p.f.)_V = KI/[(\tau_1 s + 1)\ (\tau_2 s + 1)] \qquad (18)$$

where K has units of sec$^{-1}$. The characteristic equation of the vertical loop is (from FIG. 1) seen to be:

$$s^3 + (1/\tau_1 + 1/\tau_2) + (1/\tau_1\tau_2)s + K/\tau_1\tau_2 = 0 \qquad (19)$$

In order to insure good dynamics, it is desired that the roots of this equation be of the form:

$$(s + \alpha)\ (s^2 + 2\ \zeta\ \omega_n\ s + \omega_n^2) = 0 \qquad (20)$$

For acceptable dynamics, $\zeta$ should be about 0.6; for acceptable erection time, $\omega_n$ should be about 0.03 rad/- sec and $\alpha$ about 0.2 sec$^{-1}$. These conditions set $\tau_1$ at 24 sec, $\tau_2$ at 5.1 sec, and $K$ at 0.0222 sec$^{-1}$. The standoff error for one meru (0.015°/hr) gyro drift would then be about 0.65 sec of arc, which is acceptable. These values are given as a guide for the choosing of actual performance function values, which are influenced by other factors as well as dynamic considerations.

Vertical dynamics can be neglected when considering the azimuth loop, if the vertical dynamics are much quicker than the azimuth dynamics. Assuming this to be true, FIG. 2 can be simplified, by use of Equation (10), to the azimuth system of FIG. 3.

To separate the vertical and azimuth loop dynamics and to average the input information to the azimuth performance function over a long period, the (p.f.)$_A$ must be a first order lag with a long time constant. Thus, if $$(p.f.)_A = K_A/(\tau_3 s + 1) \tag{21}$$

then the azimuth characteristic equation is $$s^2 + 1/\tau_3\, s + \omega_{(IE)N} K_A/\tau_3 = 0 \tag{22}$$

For a damping coefficient of 0.5 an exponential decay time constant of 0.004 sec$^{-1}$, $\tau_3$ equals 125 sec and $K_A$ equals 110/cos(Lat.). This would result in an azimuth standoff error of 4 min of arc per meru gyro drift about the vertical. These figures are, however, useful only as a guide, as the vertical and azimuth dynamics are not completely separate.

Figure 3:
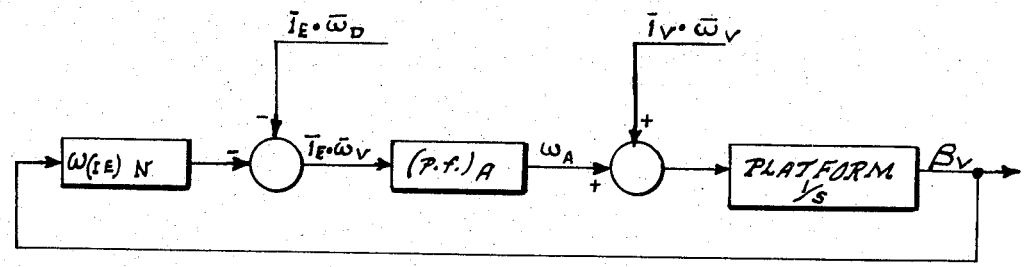
FIG. 3 represents a simplified azimuth block diagram.

It is apparent from FIG. 3 that the best attainable azimuth erection accuracy is:

$$\beta_V = (\overline{1}_E \cdot \overline{\omega}_D)/\omega_{(IE)N} \tag{23}$$

For gyro drift of 0.5 meru and a latitude of 45°

$$(\beta_V)_{min} = 1.7 \text{ min. of arc} \tag{24}$$

With the disclosed equations in mind it is now possible to set forth the method of the instant invention. The method utilizes the accelerometer outputs of, for example, the vertical erection system. The instant method is also capable of utilizing the accelerometer outputs of the azimuth erection system, however, since the method of the instant invention has as its primary purpose speeding of the taking the differences between accelerometer outputs by changing a phase difference in an input pulse to a pulse rate in the output, it is not deemed necessary to set forth all situations in which the invention is useful. Therefore, the following description set forth the instant methods application within the vertical erection system.

Figure 4:
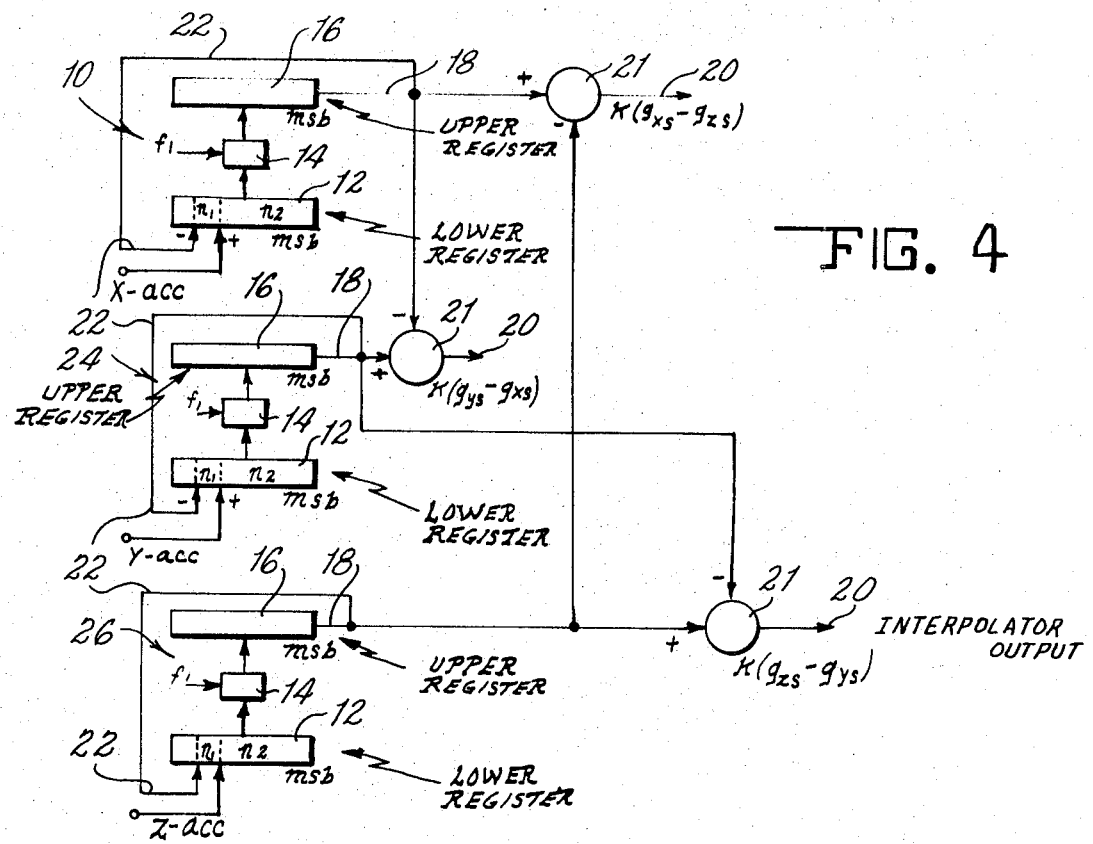
FIG. 4 represents a block diagram illustrating the technique for speeding the taking of differences between accelerometer outputs.

Referring now to FIG. 4, wherein like numerals will hereinafter designate similar elements, the instant method comprises feeding the accelerometer output pulses into the lower register 12 of a digital differential analyser 10 at a value $n$. The $n$ is defined as an integer which is obtained by adding the pulses at some level greater than the least significant bit of the register 12. The next step is accumulating a number of pulses in the lower register 12 and, periodically, at a significantly higher frequency than the frequency of the input pulse train, adding the contents of the lower register 12 by means of adding logic 14 to the contents of the upper register 16. At a time when the contents of the upper register 16 exceeds a predetermined value the next step comprises simultaneously subtracting this value from the upper register 16 and generating an overflow pulse 18. This overflow pulse 18 is utilized as an interpolator output pulse 20 after passing through pulse train adder 21 to be compared a standard for a predetermined period of time and as a pulse 22 to be fed back into a least significant bit of the lower register with a reversed sign. In the case of a vertical erection system the outputs of the upper registers of digital differential analysers 10, 24, and 26 are compared. The system of the instant method (called, for convenience, an interpolator) actually "looks between the bits" and will be explained hereinafter in more detail.

Figure 5:
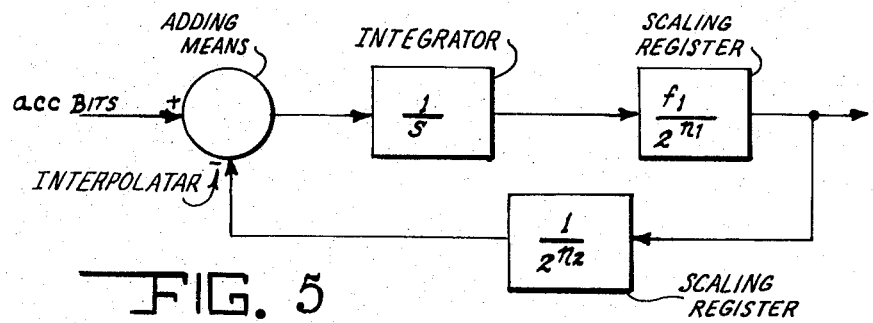
FIG. 5 represents an analog equivalent of the digital interpolator.

The analog block diagram of the interpolator is shown in FIG. 5 and its transfer function is:

$$K_1 G_1(S) = 2^{n_1}/[2^{(n_1+n_2)} 1 f_1][S+1] \tag{25}$$

Since, as will be seen, the total length of the registers is 17 bits and since the maximum practical clock frequency is about 82,000 cycles per sec, $f_1$ is chosen to be 1,609 cps, which allows time sharing of a single logic circuit by the three interpolators. With this value of $f_1$, the maximum interpolator output rate is 1,600 cps and thus the maximum value of $n_1$ is 3 bits. Next, $n_2$ is chosen so that the time constant will be about 24 sec. and is therefore set at 12 bits. These values result in $$K_1 G_1(s) = 8 \text{ bps/bps}/(20.4\, s + 1) \tag{26}$$

Figure 6:
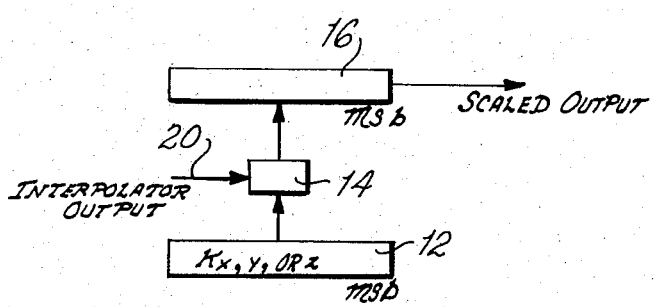
FIG. 6 represents a digital method of adjusting scale factors.

FIG. 4 is not quite accurate in that the interpolator outputs must be corrected for accelerometer scale factor differences before they can be compared. This can be simply accomplished as in FIG. 6. Since the scaling is to be accurate to one part in 100,000 the scaling register (and thus, for practical reasons, all other registers in the system) must be 17 bits long ($2^{17} = 131,072$).

The next step in the process is to compare the outputs of the $x$, $y$ and $z$ accelerometer scalers, as indicated in Equation 13. This is done by feeding the bits into a register; one bit train being added and the other subtracted. Any pulse remaining in the register represents a difference and causes an output pulse to step a stepping motor which turns a potentiometer. This system results in two problems. First, the stepper has a maximum stepping rate of about 40 to 50 steps per second. Second, a stepper acts as a pure integrator and would thus cause instability in the vertical loop. The first problem is solved by limiting the stepper input rate to an acceptable value and allowing any extra difference pulses to accumulate until the stepper is ready to take another step. The second difficulty is removed by adding negative feedback around the stepper.

Figure 7:
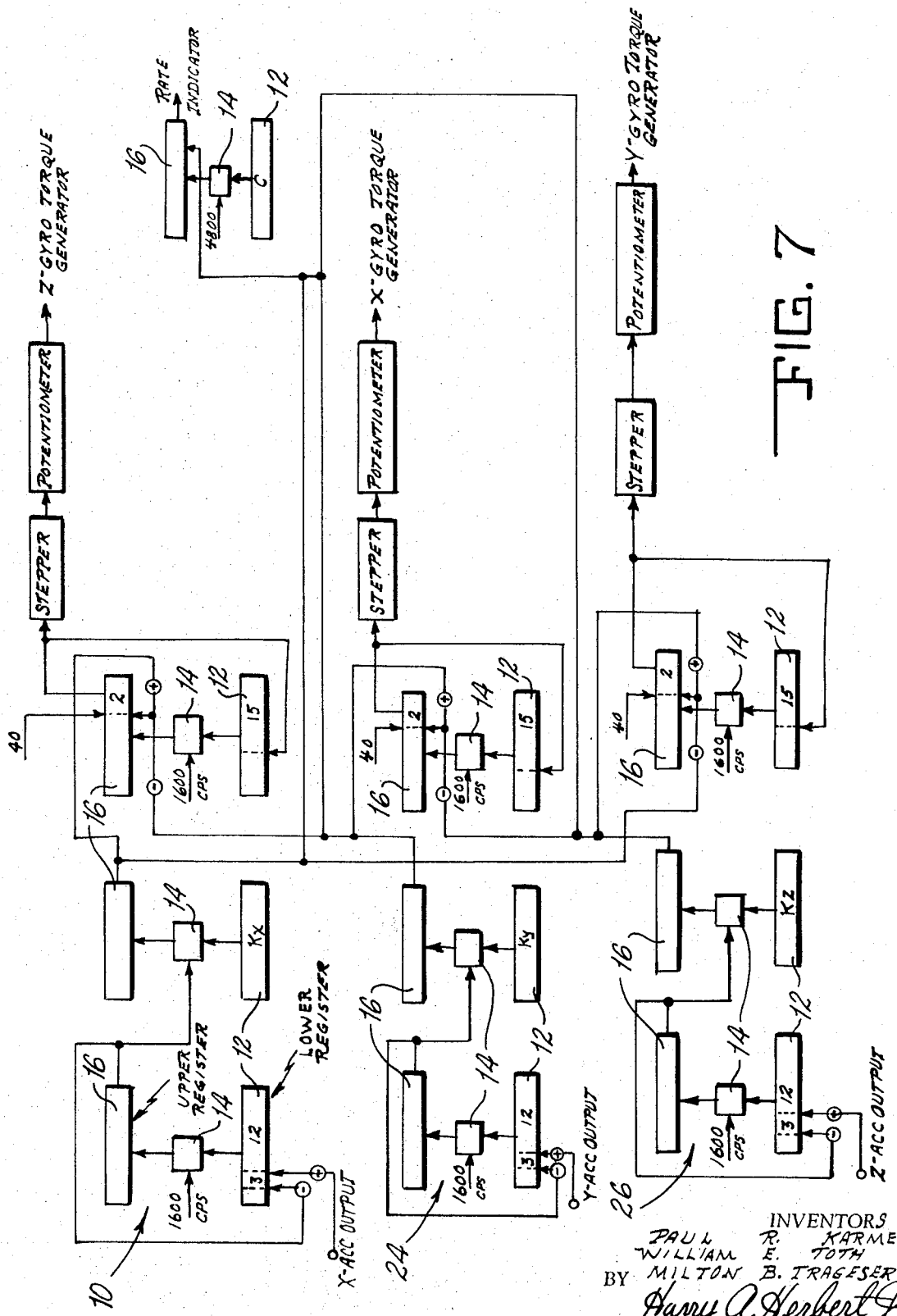
FIG. 7 represents a complete vertical erection system.

The diagram of the complete vertical erection system is shown more clearly in FIG. 7.

MODE OF OPERATION

In order to better understand the method of the instant invention an example will be worked out.

For the purpose of this example, it will be assumed that $r_x$ and $r_y$ in FIGS. 9A and 9B are the outputs of two accelerometers 28 and 30 having equal scale factors of a magnitude such that their output will be 160 bits per second when the platform is perfectly erected. (This is somewhat higher than would actually occur, but simplifies the discussion.)

It would be of interest to consider the nature of the pulse trains during steady state operation. Such steady state operation takes place when the platform is perfectly erected; that is, after the start up transient has damped out. FIG. 8 represents such a steady state operation.

No dither is shown in FIG. 8 on the $r_x$ and $r_y$ trains as it does not affect the discussion. Only every eighth $f_1$, $f_x$ and $f_y$ pulse is shown, for clarity, but omitted pulses are indicated by a bracket and a numeral.

Prior to the time shown in FIG. 8, the platform has been perfectly erected ($r_x = r_y = 160.000$ bits/sec) and the system has reached its steady state operation. It is clear that in the steady state operation the lower register contains a nearly constant quantity. It has been found that optimum results occur when each "$r$" (input) pulse is added in to the lower register with a weight of eight times that for each $f$ (overflow) pulse. It is therefore apparent that in steady state operation each $r$ (input) pulse must be matched by eight $f$ (overflow) pulses.

Now assume the platform drifts so that $r_x$ remains at 160.000 bits/sec but $r_y$ increases by one part in 100,000. In other words there is a phase difference in $r_y$. There is therefore no change in either $r_x$ or $f_x$, but $r_y$ begins to be added into the lower Y register (see FIG. 9B) before the eighth feedback pulse occurs (shown in part B of FIG. 8). As yet this causes no change in the upper Y register or in $f_y$, because $r_y$ has not yet advanced in phase by one iteration cycle interval (1/1600 second).

In part B of FIG. 8, $r_y$ has shifted by one iteration cycle (this takes about 60 seconds), and now the $r_y$ pulse arrives in the lower register one interation cycle before the eighth feedback pulse. Thus, for this one iteration cycle per input pulse, the number in the lower register increases by one and this extra one is added into the upper Y register.

This process continues until finally (after about 25 seconds) the extra ones added into the upper Y register cause an extra overflow or feedback pulse (part C, FIG. 8). Thus one more $f_y$ than $f_x$ pulse occurs and this one pulse can be used to re-erect the platform, that is, the pulse rate can be used to re-erect the platform. If this drift and change in pulse rates had had to be detected by merely counting $r_x$ and $r_y$, the time to obtain the information would be 625 seconds instead of the above 85 seconds. It is clear that $r_x$ and $r_y$ need not be in phase because $r_x$ is compared with $f_x$ and $r_y$ with $f_y$, but $r_x$ is not compared directly with $r_y$.

While there has been described what is at present considered to be the preferred method of this invention, it will be obvious to those skilled in the art that various changes and modifications may be made therein without departing from the inventive concept, and it is, therefore, aimed in the appended claims to cover all such changes and modifications as fall within the true spirit and scope of the invention.

What is claimed is:

1. A method of changing a phase difference in an input pulse to a pulse rate in the output comprising feeding periodically spaced pulses into the lower register of a digital differential analyser at a value which is obtained by adding the pulses at some level greater than the least significant bit of the register, accumulating a number of pulses in the lower register, periodically, at a significantly higher frequency than the frequency of the input pulse train, adding the contents of the lower register to the contents of the upper register of the digital differential analyser, when the contents of the upper register exceeds a predetermined value, simultaneously, subtracting this value from the upper register and generating an overflow pulse, and utilizing this overflow pulse both as an output to be compared with a predetermined reference and as a pulse to be fed back into a least significant bit of the lower register with a reversed sign.

2. A method of changing a phase difference in an input pulse to a pulse rate in the output as defined in claim 1 wherein the value of the pulses being fed into the lower register is eight.

* * * * *